United States Patent [19]

Smith, Jr.

[11] 4,094,622
[45] June 13, 1978

[54] FOAM DEPOSITION APPARATUS

[75] Inventor: Hubert Stacy Smith, Jr., Bay City, Mich.

[73] Assignee: The Dow Chemical Company, Midland, Mich.

[21] Appl. No.: 732,626

[22] Filed: Oct. 15, 1976

Related U.S. Application Data

[60] Division of Ser. No. 634,997, Nov. 24, 1975, Pat. No. 4,034,027, which is a continuation of Ser. No. 487,073, Jul. 10, 1974, abandoned, which is a continuation of Ser. No. 302,840, Nov. 1, 1972, abandoned.

[51] Int. Cl.² .................................................. B29D 27/04
[52] U.S. Cl. ........................................ 425/224; 425/64; 425/329; 425/471; 425/817 C
[58] Field of Search ................ 425/817 C, 4 C, 380, 425/381, 376 B, 224, 329, 471, 64, 115; 264/209, 32, 34, 46.2

[56] References Cited

U.S. PATENT DOCUMENTS

| | | | |
|---|---|---|---|
| 3,230,902 | 1/1966 | Grimm et al. | 425/380 X |
| 3,443,276 | 5/1969 | Smith et al. | 425/4 C |
| 3,513,504 | 5/1970 | Ronden | 425/381 |
| 3,560,600 | 2/1971 | Gliniecki | 425/4 C X |
| 3,797,981 | 3/1974 | Van Dijk | 425/817 C X |
| 3,870,451 | 3/1975 | Gokcen | 425/381 X |
| 3,915,616 | 10/1975 | Nackaerts | 425/817 C X |

*Primary Examiner*—Francis S. Husar
*Assistant Examiner*—Mark Rosenbaum

[57] ABSTRACT

In an apparatus for the deposition of hardenable foamable compositions wherein a strip of foamable liquid composition is deposited within a restraining channel and subsequently hardened by means of a centrifugal dispensing head to form a hollow generally tubular strip, improved uniformity is obtained employing a spinning mandrel which projects into the portion of the strip during the foaming and partial curing.

6 Claims, 2 Drawing Figures

FOAM DEPOSITION APPARATUS

CROSS-REFERENCE TO RELATED APPLICATIONS

This is a division of application Ser. No. 634,997 filed Nov. 24, 1975, now U.S. Pat. No. 4,034,027, which in turn is a Continuation of application Ser. No. 487,073, filed July 10, 1974, now abandoned, which in turn is a Continuation of Ser. No. 302,840 filed Nov. 1, 1972, now abandoned.

This invention is an improvement in the apparatus and method disclosed in U.S. Pat. No. 3,443,276, herewith incorporated by reference. Reactive foam materials are deposited in a plurality of strips or loops and beneficially in a generally helical spiral manner to provide walled structures. Such structures can be made with preformed plastic foam strips which are welded or bonded to each other, or alternately can be formed by depositing successive strips of hardenable foamable liquid material such as polyurethane resin components. One particularly advantageous technique is to centrifugally deposit urethane foam forming components in a generally rectangular enclosure. Three sides of the enclosure can be moving belts while the fourth side can be an already deposited foam layer.

The resultant strip is in the form of a hollow rectangular tube which optionally may have an opening extending longitudinally therethrough. In many instances such an opening is very desirable in that it serves as a passage for various services such as electrical conductors, heating and cooling air, communication lines and the like. The passage can also be employed with benefit during the preparation of a structure as a heat exchange fluid passageway to assist in curing the deposited foamed resin. Deposition of a hollow strip of uniform geometry is difficult particularly under varying field conditions. Very minor changes in temperature conditions can result in large changes in the size of the interior cavity. Frequently there is encountered a phenomenon known as surging wherein the foam appears to be deposited in a cyclical manner and the passage will vary from large to small and in some instances close entirely.

It would be desirable if there were available an improved method and apparatus for the deposition of foamable hardenable materials in strip form.

It would also be desirable if there were available improved method and apparatus which would deposit such a strip with a relatively uniform passageway therein.

It would further be desirable if there were available an improved method and apparatus for the deposition of foamable hardenable liquid materials which is relatively insensitive to operating conditions.

These benefits and other advantages in accordance with the present invention are achieved in an apparatus for the deposition of hardenable foamable resin, the apparatus comprising in cooperative combination a foam depositing head, the depositing head comprising a frame, the frame operating at least first and second foam restraining means, a drive means adapted to advance the depositing means at a predetermined rate, a means to dispense foamable hardenable synthetic resinous material within the restraining means, the dispensing means having a deflecting means to generally radially outwardly direct the hardenable foamable material by centrifugal force, the improvement which comprises a rotatable mandrel affixed generally adjacent the dispensing means, and means to rotate said mandrel.

Also contemplated within the scope of the present invention is a method for the deposition of a hollow strip of a hardened foamable synthetic resinous material, the method comprising depositing into a peripherally restraining configuration a foamable hardenable synthetic resinous material in the generally radially outward direction from a centrally disposed depositing means, permitting the resinous material to foam and harden, the improvement which comprises rotating a configuration within the resin during at least the initial portion of its curing and hardening.

Further features and advantages of the present invention will become more apparent from the following specification taken in connection with the drawing wherein.

Figure 1:
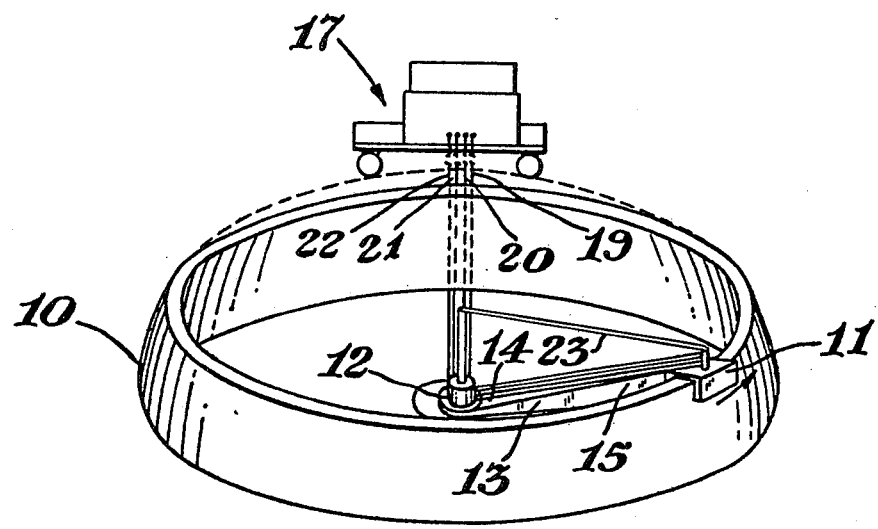
FIG. 1 is a schematic representation of foam deposition in accordance with the present invention.

In FIG. 1 there is schematically represented a structure 10 being fabricated employing apparatus in accordance with the present invention. An operating head 11 is spirally depositing a synthetic resinous foaming material to form the structure 10. The foam depositing head 11 is moving in the direction indicated by the arrow. A pivot 12 is centrally disposed within the structure 10. The pivot 12 has affixed thereto an arm or boom 13 having a first end 14 pivoted to the pivot 12 in such a manner that the boom 13 may describe a varying solid angle. The arm 13 has a second end 15 which is pivotally affixed to the material depositing head 11. A mobile power and material source 17 is remotely disposed from the structure 10. A plurality of lines 19, 20, 21 and 22 provide communication between the power and material source 17 and the foam depositing head 11. An elevating means 23 adjustably positions the head 11 or eye of the boom 15 in a vertical direction. Alternately, the supply means may be located at any convenient point such as the pivot 12.

In operation of the apparatus represented in FIG. 1, power and formable material are supplied from the power and material source 17 through the lines 19, 20, 21 and 22 through rotary joints (not shown) in the pivot 12. The operating head is so constructed and arranged so as to grip the existing portion of the structure 10 and propel itself in the direction indicated by the arrow while simultaneously depositing a quantity of a hardenable foamable material which adheres to the existing structure 10 and increases its height by a predetermined amount generally in the manner of the addition of a foam strip in accordance with U.S. Pat. No. 3,206,899, herewith incorporated by reference thereto.

Figure 2:
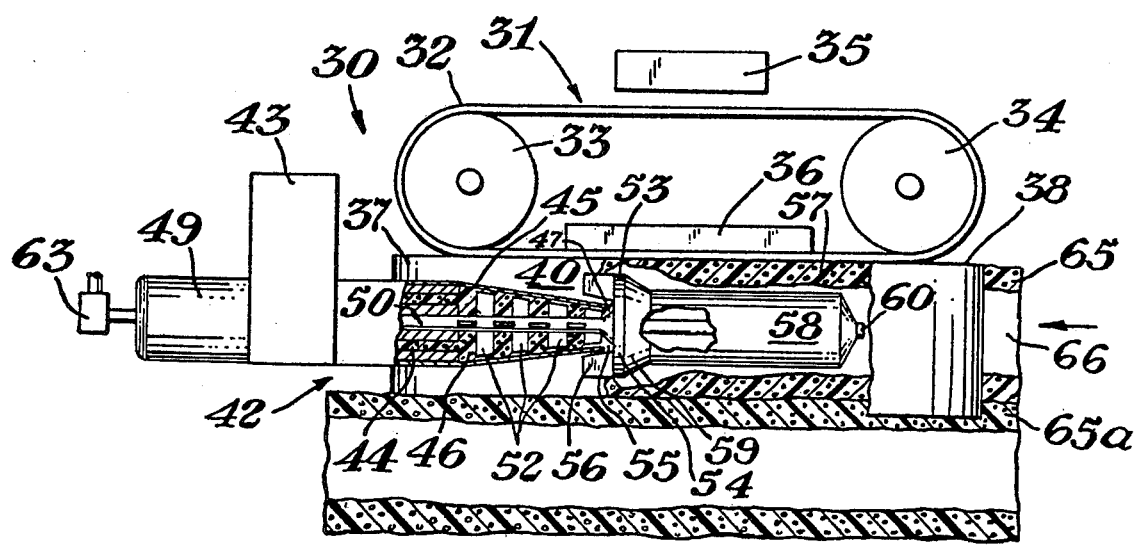
FIG. 2 is a schematic partially cutaway view of a foam depositing head of the present invention.

In FIG. 2 there is depicted a schematic fractional cutaway view of a foam depositing head in accordance with the present invention generally designated by the reference numeral 30. The depositing head 30 comprises an upper restraining means or forming belt assembly 31 which comprises an endless belt 32 supported by a drum 33 and a drum 34. A belt heater 35 is disposed adjacent the belt 32. A belt support plate 36 is disposed within the belt 31 and adjacent the area wherein foamable material is deposited. A first side belt assembly 37 is disposed adjacent the top belt assembly 31 and is generally similar to the top belt assembly 31. A second side belt assembly 38 is oppositely disposed to the side belt assembly 37. The belt assemblies 31, 37 and 38 provide a restraining means and form a generally rectangular channel 40. A foam depositing head 42 is disposed at least partially within the channel 40. The depositing head 42 comprises in cooperative combination a housing 43 defining a first foam component passageway 44, a second foam component passageway 45, a mixing chamber 46 and a foam exit port 47. A motor or mixer rotating means 49 is affixed to the housing 43 and is operatively affixed to a hollow rotatable shaft 50 passing through the housing 43 and is generally coaxial with the channel 40. A plurality of agitator blades 52 are affixed to the shaft 50 and are partially disposed within the mixing chamber 46. A foamable resinous material 55 is propelled generally radially outwardly from the discharge opening 47 by a head or discoidal deflecting element 54 aided by a plurality of blades 56 affixed to the shaft 50. The material 55 is deposited on the surfaces defining the channel 40 where it foams to form a hollow generally rectangular tube of foamed material 57. Operated on the shaft remote from the mixing chamber 46 is a generally cylindrical mandrel 58 generally coaxially disposed to the shaft 50 and rotated thereby relative to the restraining means. A generally frustoconical section 59 of the mandrel 58 is disposed adjacent the blades 56 and tapered toward the major body of the mandrel 58. Remote from the blades 56 the mandrel 58 has a discharge orifice 60 which is in full communication with the hollow shaft 50 and a fluid or gas source, not shown, by means of a rotary joint 63. The foam depositing head travels in the direction indicated by the arrow. A hollow deposited foam strip 65 is shown which defines an internal passageway 66 having a generally uniform cross-section. The strip 65 as depicted in FIG. 2 is being deposited on a previously deposited strip 65a.

The apparatus of the present invention can be employed with all foamable hardenable liquid resinous materials. Appropriate temperature and formulation control are known to those skilled in the art. All of the hardenable resinous compositions disclosed in U.S. Pat. No. 3,443,276 are eminently satisfactory for most operations. Apparatus generally as depicted in FIG. 2 provides highly satisfactory strips with acceptably uniform passageways therethrough. The apparatus and method of the present invention appear to operate by mechanically rupturing foam cells which contact the surface of the rotating cylinder. For most purposes it is not necessary that the surfaces of the cylinder extend into the tube for any great distance, and generally a distance of from about 1 to 2 feet is satisfactory. This, however, is variable, depending on the rate of deposition, temperature, formulation and the like. When the surface extends to a location where the cured resin normally has expanded to about 75 percent of its ultimate foam, satisfactory results are obtained. However, if greater uniformity of the passageway is desired the rotating cylinder will extend further into the deposited strip. It is desirable that the surfaces of the cylinder be prepared from a material of low adhesive characteristics such as polytetrafluoroethylene, polypropylene or the like.

The apparatus of the present invention provides a particularly convenient mode of construction as a continuous passageway of generally defined size is provided within the deposited foam strip. Beneficially, curing of the deposited foam is at least partly accomplished or aided by applying a suitable heat exchange fluid through the hollow shaft 50 by means of the rotary joint 63 and discharging the gas from the discharge orifice 60. Depending upon the characteristics of the particular material being cured, the gas such as air may be heated to accelerate a cure or may be cooled to prevent a too rapid cure.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an apparatus for the deposition of hardenable foamable resin in the form of a hollow strip, the apparatus comprising in cooperative combination a foam depositing head, the depositing head comprising a frame, the frame having at least first and second foam restraining means, a drive means operatively associated with said depositing head to advance the depositing head at a desired rate, a means operatively associated with said first and second restraining means to dispense foamable hardenable synthetic resinous material within the first and second restraining means, the dispensing means having a deflecting means to generally radially outwardly direct the hardenable foamable material by centrifugal force, the improvement which comprises
 a rotatable mandrel affixed generally adjacent the dispensing means,
 means connected to said mandrel to rotate said mandrel relative to the restraining means, the mandrel being disposed between the first and second restraining means and to contact the hardenable foamable resin during at least the initial portion of its foaming and hardening to thereby form a hollow foamed strip having a passageway therein of generally uniform cross section.

2. The apparatus of claim 1 wherein the mandrel is supported on a hollow rotatable shaft, the shaft having a passageway defined therein, the passageway extending through the mandrel and terminating remote from the depositing head.

3. The apparatus of claim 1 wherein the rotatable mandrel has a generally cylindrical configuration.

4. The apparatus of claim 1 wherein the deflecting means is a generally discoidal deflecting element.

5. The apparatus of claim 4 including a plurality of blades affixed to the rotating shaft of an adjacent discoidal deflecting element.

6. The apparatus of claim 3 wherein the mandrel has an external surface of polytetrafluoroethylene.

* * * * *